Patented June 18, 1935

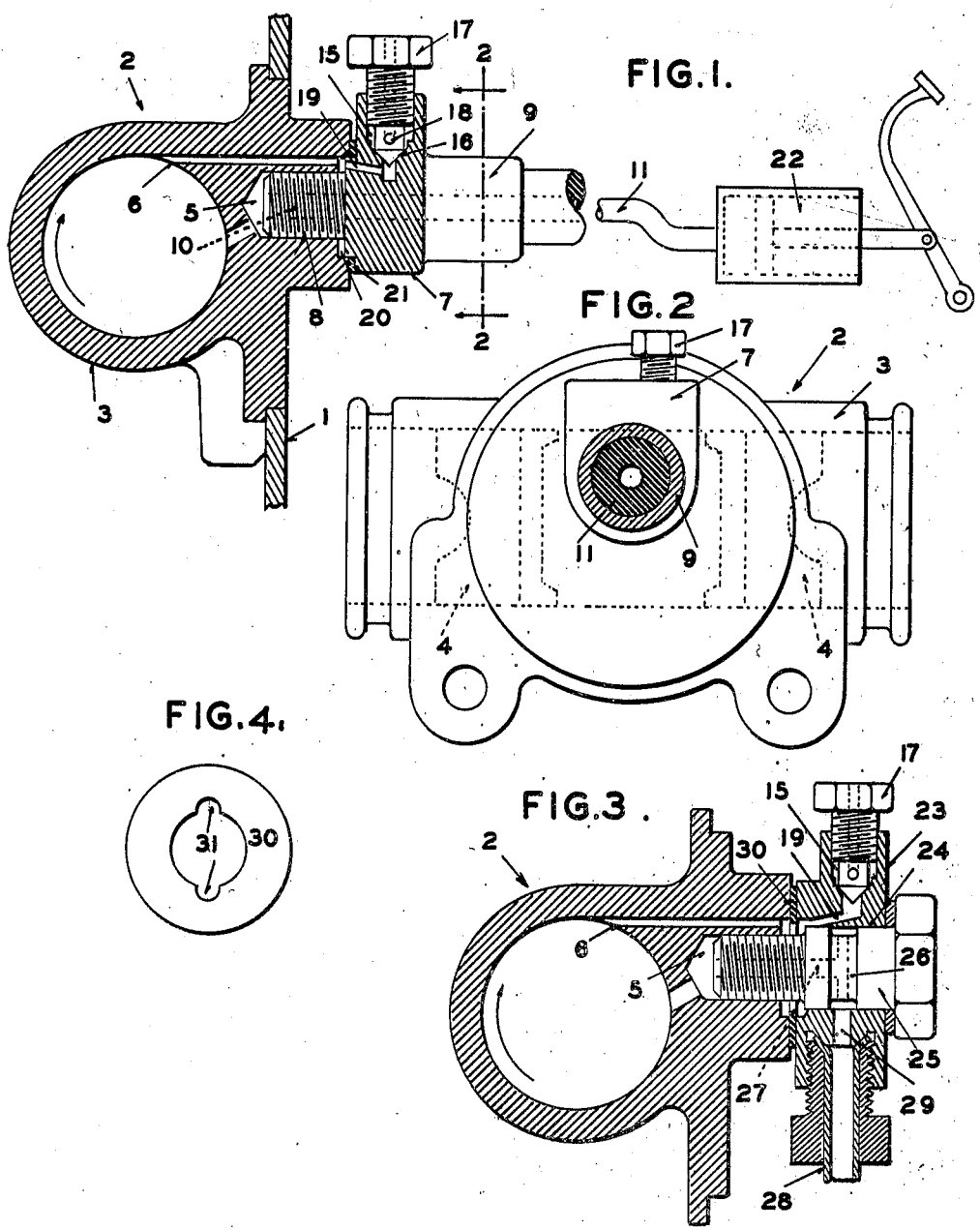

2,004,980

UNITED STATES PATENT OFFICE 2,004,980

FLUID PRESSURE MECHANISM

Burns Dick, Ferguson, Mo., assignor to Wagner Electric Corporation, St. Louis, Mo., a corporation of Delaware Application September 13, 1933, Serial No. 689,200

12 Claims. (Cl. 60—54.6)

My invention relates to fluid pressure mechanism and more particularly to means for connecting a fluid supply conduit to a fluid receiving chamber whereby the bleeding of air from the system may be efficiently accomplished.

One of the objects of my invention is to so combine a conduit fitting and bleeder valve with a fluid receiving chamber that the bleeder valve for controlling the bleeding passage from the cylinder will be carried by the fitting.

Another object of my invention is to so position the fluid supply inlet to the chamber and the bleeding outlet therefrom that during the bleeding of the system fluid will be circuited through the chamber in a circular path.

Still another object of my invention is to construct a simple and inexpensive conduit fitting provided with a valve-controlled bleeder passage that will be efficient in operation and will be easily attached and detached from a fluid receiving chamber.

In the accompanying drawing, which illustrates two embodiments of my invention, Figure 1 is a cross sectional view of a portion of a fluid braking system showing my novel combined conduit fitting and fluid receiving chamber; Figure 2 is a view on the line 2—2 of Figure 1; Figure 3 is a cross sectional view of a modified construction adapted for use with a non-flexible conduit; and Figure 4 is a view of the sealing washer used in the construction shown in Figure 3.

Referring in detail to Figures 1 and 2, the numeral 1 indicates a backing plate for a brake assembly to which is secured the usual brake shoe actuating motor 2 comprising a cylinder 3 containing a pair of shoe operating pistons 4, all of well known construction. The wall of the cylinder 3 is provided with a threaded opening 5 which enters the bore of the cylinder at a substantial angle to a radial line of the cylinder whereby the entering fluid will flow toward the bottom of the cylinder bore. The cylinder wall is also provided with a second opening 6 lying above the threaded opening. This opening enters the bore of the cylinder at the top and approximately tangent to the internal cylinder wall.

A conduit fitting member 7 is provided with a screw-threaded extension 8 cooperating with the threaded opening 5 and a tubular extension 9, the extension 8 having a passage 10 extending into the tubular extension 9. The tubular extension 9 receives and securely holds the end of a conduit 11 of flexible material, as for example, rubber or rubber and fabric.

The body of the fitting member is provided with a screw-threaded opening 15 having a valve seat 16 at its bottom. A threaded bleeder valve 17 cooperates with the threaded opening and the valve seat. The valve has a passage 18 therethrough whereby when the valve is unscrewed, fluid may flow out of the opening. When the valve is screwed down, the opening is positively closed. The bottom of the opening 15 is connected with a passage 19 for cooperation with the outlet passage 6 of the fluid cylinder. In order to insure that the passages 19 and 6 are at all times in communication when the fitting is in place, regardless of whether their adjacent ends coincide, the cylinder is provided with a counter-bore 20 surrounding the screw-threaded passage 5. A portion of the fitting member 7 extends into the counter-bore, as shown. A suitable packing washer 21 prevents any possibility of leakage. The flexible conduit is connected in a well known manner to the usual pedal-actuated compressor 22 of the braking system.

In normal operation of the brake system the bleeder valve is screwed down on its seat to close the passage 15. Fluid under pressure is forced into the cylinder by the compressor to oppositely move the cylinder pistons to expand the brakes. When pressure is released from the pedal, the brakes are automatically released by the brake return springs, not shown. When it becomes necessary to bleed the system, as for example, to eliminate air in the cylinder or other parts of the system, the valve 17 is unscrewed sufficiently to open the passage 15, and then the compressor is operated as a pump to force the air out of the system. With the relative positions of the inlet passage 5 and outlet passage 6 as shown, the fluid will be forced through the cylinder in a circular path, as indicated by the arrow, consequently mixing with and picking up the air and carrying it out through the outlet passage. This mixing of the air with the fluid is found to be the quickest and most positive way of eliminating air from the system.

In Figures 3 and 4 I have shown my invention embodied in a fitting for use with a non-flexible conduit, as for example, a copper tube, such a construction being useful at the rear wheel assembly where the wheels are not of the dirigible type. The cylinder is constructed in the same manner as in Figure 1, thus permitting the cylinder to be used on any of the wheels. The fitting 23 is provided with a cylindrical opening 24 for receiving an attaching bolt 25 cooperating with the threaded passage 5 in the cylinder. The bolt snugly fits the opening 24 and is provided with an annular groove 26 which communicates with the cylinder by way of a passage 27 in the bolt. The fluid supply tube 28 leading from the compressor 22, is secured to the fitting by a standard connection and communicates with the annular groove 26 through a passage 29 in the fitting.

The bleeder valve 17 and the bleeder passages 15 and 19 in the fitting are the same as those in the fitting of Figure 1. The sealing washer 30, however, is provided with cut out recesses 31 to permit easy communication between the passages 6 and 19.

Having fully described my invention, what I claim as new and desire to secure by Letters Patent of the United States is:

1. In fluid pressure mechanism, the combination of a fluid receiving chamber, a fitting secured to the wall of the chamber and provided with a pair of passages, said fitting forming no part of the wall of the chamber, a fluid supply conduit secured to the fitting and communicating with one of said passages, a valve carried by the fitting for controlling the other passage, and means providing communication between said chamber and each of the passages in the fitting.

2. In fluid pressure mechanism, a fluid receiving cylinder, a pair of oppositely moving pistons in the cylinder, said piston and cylinder forming a fluid receiving chamber between the pistons, a fluid supply conduit, a fitting secured to the conduit and to the portion of the cylinder wall comprising part of the fluid receiving chamber and having a passage providing communication between said conduit and the chamber between the pistons, said fitting also having a second passage providing communication between said chamber and the atmosphere independently of the first named passage, and a valve for controlling said second passage.

3. In fluid pressure mechanism, the combination of a fluid receiving chamber provided with a pair of adjacent openings through its wall, a fitting secured to said chamber, a conduit secured to the fitting for supplying fluid to said chamber, means forming a passage in the fitting for providing communication between said conduit and one of the openings in the chamber wall, and means comprising a valve-controlled passage in the fitting and independent of the first named passage for providing communication between the other chamber opening and the atmosphere.

4. In fluid pressure mechanism, the combination of a fluid receiving chamber provided with a pair of openings through its wall, a fitting secured to said chamber and provided with a pair of passages, each communicating with one of said chamber openings, a fluid supply conduit secured to said fitting and communicating with one of the passages, and a valve carried by the fitting and controlling the other passage.

5. In fluid pressure mechanism, the combination of a fluid receiving chamber provided with a pair of openings through its wall, a fitting secured to the chamber wall and carrying an extension projecting into one of said openings, said fitting and extension being provided with a passage, a fluid supply conduit connected to the fitting and communicating with the passage, a valve-controlled passage in the fitting, and means providing communication between said valve-controlled passage and the other opening in the chamber wall.

6. In fluid pressure mechanism, the combination of a fluid receiving chamber provided with a pair of openings through its wall, a fitting secured in fluid-tight relation to the chamber wall and comprising a tubular extension in fluid-tight engagement with the wall of one of said openings, a chamber surrounding said extension and in communication with the other opening, a valve-controlled passage in the fitting communicating with the chamber surrounding the extension, and a fluid supply conduit in communication with the tubular extension.

7. In fluid pressure mechanism, the combination of a fluid receiving chamber provided with a threaded opening in its wall, a fitting provided with a tubular extension screw-threaded in said opening, a conduit secured to the fitting and communicating with the tubular extension, said fitting also being provided with a passage communicating with the atmosphere, a valve for said passage, and means providing communication between the fluid receiving chamber and the valve-controlled passage.

8. In fluid pressure mechanism, the combination of a fluid receiving chamber provided with a threaded opening in its wall, a fitting provided with a tubular extension screw-threaded in said opening, a conduit secured to the fitting and communicating with the tubular extension, said fitting also being provided with a passage communicating with the atmosphere, a valve for said passage, means providing communication between the fluid receiving chamber and the valve-controlled passage, said means comprising an opening in the fluid receiving chamber, and an annular chamber surrounding the fitting extension.

9. In fluid pressure mechanism, the combination of a fluid receiving chamber provided with a threaded opening in its wall, a fitting member, a bolt provided with a passage and cooperating with the threaded opening for securing the fitting to the chamber, a conduit secured to the fitting and communicating with the chamber by way of the passage in the bolt, means forming a passage in the fitting, a valve for controlling said passage, and means providing communication between said chamber and the valve-controlled passage.

10. In fluid pressure mechanism, the combination of a fluid receiving chamber provided with a threaded opening in its wall, a fitting member, a bolt provided with a passage and cooperating with the threaded opening for securing the fitting to the chamber, said bolt having an annular groove communicating with the passage in the bolt, a conduit connected to the fitting member and communicating with the annular groove, means forming a passage in said fitting, a valve controlling said passage, means forming a second opening in the fluid receiving chamber wall, and means providing communication between said last named opening and the valve-controlled passage.

11. In fluid pressure mechanism, a fluid chamber, a fitting member provided with a threaded extension adapted to be screwed into the wall of the fluid chamber, said extension and fitting being provided with a passage communicating with the chamber, a conduit secured to the fitting and communicating with the passage, means forming a second passage through said fitting, one of the ends of said last named passage communicating with the chamber independently of the threaded extension of the fitting, and a valve for controlling said second passage.

12. In fluid pressure mechanism, the combination of a fluid receiving chamber provided with an opening, a conduit element separable from the chamber and provided with a passage communicating with the chamber through said opening, a member provided with an opening through which the conduit element extends and which is clamped to the chamber wall by said element, said member being provided with a passage communicating with the chamber independently of the first named passage, a fluid supply conduit connected to communicate with one of said passages, and a valve for controlling the other passage.

BURNS DICK.